(12) United States Patent
Naef et al.

(10) Patent No.: US 12,345,544 B2
(45) Date of Patent: *Jul. 1, 2025

(54) METHOD FOR PREDICTING FUTURE DRIVING CONDITIONS FOR A VEHICLE

(71) Applicant: CARROSSERIE HESS AG, Bellach (CH)

(72) Inventors: Alex Naef, Bellach (CH); Hans-Joerg Gisler, Zollikofen (CH); Martin Widmer, Grenchen (CH); Andreas Heinrich Ritter, Zürich (CH); Philipp Valentin Elbert, Zürich (CH); Christopher Harald Onder, Weisslingen (CH)

(73) Assignee: CARROSSERIE HESS AG, Bellach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,551

(22) Filed: Feb. 24, 2022

(65) Prior Publication Data

US 2022/0178704 A1 Jun. 9, 2022

Related U.S. Application Data

(62) Division of application No. 16/477,596, filed as application No. PCT/EP2018/050569 on Jan. 10, 2018, now Pat. No. 11,287,268.

(30) Foreign Application Priority Data

Jan. 13, 2017 (EP) ..................................... 17151441

(51) Int. Cl.
*G01C 21/00* (2006.01)
*B60L 15/20* (2006.01)
(Continued)

(52) U.S. Cl.
CPC ...... *G01C 21/3815* (2020.08); *B60L 15/2045* (2013.01); *B60W 20/12* (2016.01);
(Continued)

(58) Field of Classification Search
CPC .......................... G01C 21/32; G01C 21/3844; G01C 21/3815; G01C 21/26; B60W 20/12;
(Continued)

(56) References Cited

U.S. PATENT DOCUMENTS 5,832,400 A * 11/1998 Takahashi ......... B60W 30/1819
701/53
7,565,155 B2 * 7/2009 Sheha ................ G01C 21/3438
455/456.2
(Continued)

FOREIGN PATENT DOCUMENTS

DE 19962328 A1 6/2001
DE 102009030784 A1 * 2/2010 ............ B60W 10/06
(Continued)

OTHER PUBLICATIONS

Translation of DE102009030784 (Year: 2010).*
(Continued)

*Primary Examiner* — Aniss Chad
*Assistant Examiner* — Christopher George Fees
(74) *Attorney, Agent, or Firm* — Birch, Stewart, Kolasch & Birch, LLP

(57) ABSTRACT

In a method for predicting future driving conditions for a vehicle (1), sensor data (2) are gathered while the vehicle (1) is traveling on a route. A position of the vehicle (1) is also determined. The gathered data are associated with the determined vehicle position. A map (9) is created depending on the associated data. When the route is traveled again, the map is updated in real time depending on associated data from the repeated traveling. Finally, a prediction of future
(Continued)

driving conditions is obtained based on the determined vehicle position and the map (9).

14 Claims, 5 Drawing Sheets

(51) Int. Cl.
  *B60W 20/12* (2016.01)
  *B60W 50/00* (2006.01)
(52) U.S. Cl.
  CPC ..... *B60W 50/0097* (2013.01); *G01C 21/3844* (2020.08); *B60L 2240/622* (2013.01); *B60L 2240/64* (2013.01); *B60L 2240/70* (2013.01); *B60L 2260/52* (2013.01); *B60W 2300/10* (2013.01); *B60W 2520/10* (2013.01); *B60W 2520/28* (2013.01); *B60W 2556/10* (2020.02); *B60W 2556/50* (2020.02); *B60W 2710/1005* (2013.01)
(58) Field of Classification Search
  CPC ......... B60W 50/0097; B60W 2556/10; B60W 2556/50; B60W 2300/10; B60W 2520/10; B60W 2520/28; B60W 2710/1005; B60W 50/14; B60L 15/2045; B60L 2240/622; B60L 2240/64; B60L 2240/70; B60L 2260/52; B60L 2240/642; B60L 2560/54; Y02T 10/64; Y02T 10/72; Y02T 90/16
  See application file for complete search history.

(56) References Cited

U.S. PATENT DOCUMENTS

| | | | | |
|---|---|---|---|---|
| 7,706,964 B2 * | 4/2010 | Horvitz | ............... | G08G 1/0112 342/357.31 |
| 8,725,408 B2 * | 5/2014 | Hochkirchen | ........ | B60W 40/06 340/995.13 |
| 9,784,592 B2 * | 10/2017 | Gupta | .................. | B60W 30/00 |
| 9,792,575 B2 * | 10/2017 | Khasis | ................. | G05D 1/0088 |
| 9,857,183 B2 * | 1/2018 | Ogawa | ................. | G01C 21/3469 |
| 9,989,367 B2 * | 6/2018 | Bartels | .................. | G01C 21/26 |
| 10,002,531 B2 * | 6/2018 | Lynch | .................. | G08G 1/0129 |
| 10,579,939 B2 * | 3/2020 | McGavran | ............ | H04L 67/535 |
| 10,668,824 B2 * | 6/2020 | Ourabah | ............. | B60L 15/2045 |
| 11,230,292 B2 * | 1/2022 | Augst | ................ | G01C 21/3484 |
| 11,506,497 B2 * | 11/2022 | Moore | ............... | G01C 21/3492 |
| 2001/0020209 A1 * | 9/2001 | Poggenburg | ............ | B60T 8/172 701/72 |
| 2004/0068359 A1 * | 4/2004 | Neiss | ................... | G05B 13/048 180/170 |
| 2008/0027639 A1 * | 1/2008 | Tryon | ................ | G01C 21/3617 701/533 |
| 2009/0005984 A1 * | 1/2009 | Bradley | ................. | G01C 21/20 701/469 |
| 2009/0138188 A1 | 5/2009 | Kores et al. | | |
| 2015/0224990 A1 * | 8/2015 | Kim | .................. | B60W 50/0097 701/93 |
| 2016/0069695 A1 * | 3/2016 | Broadbent | ......... | G01C 21/3667 701/411 |
| 2016/0225201 A1 * | 8/2016 | Hiroki | ..................... | H04L 67/12 |
| 2016/0238396 A1 * | 8/2016 | Mund | .................. | G09B 29/106 |
| 2019/0225217 A1 * | 7/2019 | Tsukada | ............... | B60W 50/14 |
| 2019/0375421 A1 * | 12/2019 | Asher | .................. | G05B 13/048 |

FOREIGN PATENT DOCUMENTS

| | | | |
|---|---|---|---|
| DE | 102011117025 A1 * | 12/2012 | ......... B60W 30/182 |
| EP | 2 876 620 A1 | 5/2015 | |
| WO | WO 2009/098071 A1 | 8/2009 | |

OTHER PUBLICATIONS

Translation of DE102011117025 (Year: 2012).*
Office Action issued Nov. 28, 2022 in corresponding Chinese Application No. 201880017976.6.
Ambühl et al., "Predictive Reference Signal Generator for Hybrid Electric Vehicles", IEEE Transactions on Vehicular Technology, Nov. 2009, vol. 58, No. 9, pp. 4730-4740.
Gonzalez et al., "Adaptive Fastest Path Computation on a Road Network: A Traffic Mining Approach"; Proceedings of the 33rd International Conference on Very Large Data Bases (VLDB '07); Sep. 23, 2007; pp. 794-805; XP055071532; ISBN: 978-1-59-593649-3.

* cited by examiner

METHOD FOR PREDICTING FUTURE DRIVING CONDITIONS FOR A VEHICLE

This application is a Divisional of copending application Ser. No. 16/477,596, filed on Jul. 12, 2019, which is the National Phase under 35 U.S.C. § 371 of International Application No. PCT/EP2018/050569, filed on Jan. 10, 2018, which claims the benefit under 35 U.S.C. § 119(a) to patent application Ser. No. 17/151,441.7, filed in Europe on Jan. 13, 2017, all of which are hereby expressly incorporated by reference into the present application.

TECHNICAL FIELD

The invention relates to a method for predicting future driving conditions for a vehicle. The invention furthermore relates to a method for controlling a vehicle.

PRIOR ART

The power required by a vehicle during operation is dependent on various factors. In addition to a two-dimensional route profile, the topography (the elevation profile of the route) and the speed profile along the route are of particular importance in this case. The latter results for example from the road conditions, speed limits and the presence of traffic lights, crossings, rotaries or crosswalks. Besides the drive motors, further loads (for example for the air conditioning system, the lighting system, etc.) also additionally require energy.

The available power and the on-board energy store have to be adapted to the required power. Energy stores and buffer stores, such as electric batteries or capacitors, need to be sized and charged accordingly.

If the route to be traveled by a vehicle or a next section of the journey is known in advance, it is possible to take various measures, which are performed in a location-dependent and scheduled manner, to minimize the overall energy consumption, a maximum required power, a required capacity of an energy store and/or a loading of a drive or of an energy store. The provisioning and/or operating costs of the vehicle are thereby lowered, and the lifetime of said components is increased. Possible measures to be taken are charging or loading energy stores, actuating a transmission, complying with an energy-efficient speed profile or selecting a drive to be used in the case of vehicles having several drives (in particular hybrid vehicles).

The route to be traveled is often not known in advance. In some cases, however, vehicles travel repeatedly on the same routes. On the one hand, this applies to vehicles that are bound to a specific travel route (for example rail vehicles, trolleybuses) or have to serve a particular route (for example buses on a scheduled service). On the other hand, this also applies to vehicles that are used to travel regularly on the same routes independently of such specifications, for example for commuting between home and the workplace.

The article "Predictive Reference Signal Generator for Hybrid Electric Vehicles" (D. Ambühl, L. Guzzella), IEEE Transactions on Vehicular Technology Vol. 58, No. 9, November 2009 targets the energy management of hybrid vehicles, that is to say vehicles having a combustion engine and an electric engine, in particular in situations where such vehicles regularly cover the same route. The subject of the article is a drive in which the combustion engine and the electric engine act on the same shaft, such that their torques add together. The aim is to minimize fuel consumption, it being ensured, by defining limits for the state of charge (SoC), that the battery is not excessively loaded.

The regulation comprises a prediction module that draws data, inter alia, from a navigation assistance system, and a module, controlled by the state of charge of the battery as a state variable, for generating an equivalence factor that indicates the torque distribution between the electric engine and the combustion engine.

However, complete information necessary for the desired optimization is often lacking; in any case, not all of this information forms part of the data that are usually available from navigation assistance systems. Navigation assistance systems are additionally not generally designed for means of transport such as for example buses or trolleybuses, and they are accordingly not able to make reliable predictions in relation to expected speeds, stopping times, etc. Maps containing extensive information content in relation to the traveled routes are therefore required for a reliable prediction.

Various approaches for generating maps are known. A first is what is known as "collaborative mapping". In this case, data (navigation data and other sensor data) are gathered from mobile terminals of voluntary users and processed centrally offline. Since the data originate from a multiplicity of different terminals, the quality and uniformity is not necessarily guaranteed. Manual post-processing is usually required. A second approach uses a multiplicity of identically designed devices by way of which measurements are performed in the region to be mapped. However, using them and evaluating the measurement data offline is complex. A third approach uses self-driving robots or automobiles that gather sensor data. In this case too, gathering the data is complex and the map is generated offline, that is to say after the data have finished being gathered, typically on a central computer.

PRESENTATION OF THE INVENTION

The object of the invention is to provide a method, belonging to the technical field mentioned at the outset, that allows a reliable prediction of future driving conditions for a vehicle.

The achievement of the object is defined by the features of claim 1. According to the invention, the method comprises the following steps:

a) gathering sensor data while the vehicle is traveling on a route;
b) determining a position of the vehicle;
c) associating the gathered data with the determined vehicle position;
d) creating a map depending on the associated data;
e) traveling the route again, the map being updated in real time depending on associated data from the repeated traveling; and
f) obtaining a prediction of future driving conditions based on the determined vehicle position and the map.

The current position of the vehicle may be determined in particular using a global positioning system (GNSS, such as for example GPS, GLONASS, Galileo, Beidou etc.). The sensor data are generated by sensors on board the vehicle, these being able to be part of the electronics of the vehicle that are present in any case and/or to be additionally installed. The sensor data comprise for example the driving speed or the current energy consumption. They are associated with the determined vehicle position in the context of the method, and finally integrated into the map. The map ultimately associates one or more parameters with positions of the vehicle, these parameters being able to correspond to the gathered sensor data and/or to be variables derived therefrom. The map created in accordance with the method according to the invention does not cover a continuous extended two-dimensional region, but rather just locations that correspond to (previous) journeys of the vehicle, it being possible in principle to supplement the map with further elements that originate from another source, for example from a database containing map data that have been obtained from other vehicles. This supplementation may take place at the beginning, within the meaning of initialization of the map, or only when a map has already been created according to the invention.

A real-time update in the present case means that the map is present in updated form at the latest after completing the route, and no processing performed at a time after this is thus necessary. However, the update preferably takes place step-by-step during travel, such that that section of the map that corresponds to the already-traveled section of the route is essentially always already present in updated form.

The method according to the invention allows the map to be created automatically. In principle, there is no need for a preliminary external data acquisition. If the vehicle has an on-board apparatus that obtains the sensor data and data for determining the vehicle position (or the determined vehicle position) and processes them in a manner according to the invention, the map is automatically generated for the traveled route and automatically updated on the basis of new associated data upon each repeated journey. As a result, it is automatically adjusted to changed conditions (diversions, roadworks, etc.), and possible errors are reduced due to improved statistics. The method for creating and for updating the map is thus self-learning.

The method according to the invention, by gathering suitable sensor data and storing suitable parameters, is able to take into consideration circumstances that are specific to the vehicle that is used and to the purpose of use. Thus, for example, in the case of public means of transport, the specific driving dynamics of the vehicle, typical stopping times, the volume of passengers (and therefore the respective carrying capacity), the volume of traffic on particular route sections (and possibly at particular times of day) etc. are automatically taken into consideration, if for example speed and power data are measured and stored in the map. As vehicle-specific aspects are already also taken into consideration when gathering the data, it may become unnecessary to define a model of the vehicle in order to calculate the power required by the specific vehicle in a particular route section, for example from topographical data.

The method is thus particularly well suited to public means of transport, for example buses or trolleybuses. It may however also be used in connection with other road or rail vehicles for passenger or freight transport.

The method according to the invention is particularly well suited to predicting future driving conditions for vehicles that travel on predefined routes (for example buses, service buses or the like). The method is however also useful if the same route is traveled only from time to time and is not predefined but has rather been selected according to requirements. This is the case for example for passenger vehicles of private households. According to statistics, more than half of journeys are covered thereby on the same roads, since the destinations such as workplace, gymnasium, shopping facility, holiday destination, etc. are always roughly the same. As early as on one journey, it is possible to use the method to obtain information that is useful for predicting future driving conditions and therefore for controlling the vehicle when the route is traveled again.

The map advantageously comprises location-dependent power data. "Power data" are understood here to mean those data that are relevant to the power drawn by the loads of the vehicle (in particular drive motors). These include direct power data, such as current power consumption (electric power) or fuel consumption, and indirect power data that allow the power to be predicted in combination with other parameters, for example the engine speed, the driving speed, a measured incline, etc.

Updating the map advantageously comprises consolidating data from various journeys. In each further journey, the map is thus improved, and the positions and associated parameters are thus adjusted by incorporating the data that have already been acquired and associated earlier and the new associated data.

As an alternative, in the update, the positions previously stored in the map and/or the parameters or certain portions thereof may be replaced by the current values.

The gathered sensor data advantageously comprise location-relevant information. To determine the vehicle position, the gathered sensor data (or some thereof), on the one hand, and data from a global positioning system for determining the vehicle position, on the other hand, are then applied and combined. This processing is able to be implemented particularly well using a Kalman filter. Since not only the noise-impacted data from the global positioning system are applied, but rather additional sensor data as well, this results in improved position determination. It is readily understood that not all of the gathered sensor data have to enter the Kalman filter, but rather only those data that make a contribution to improving the location determination. Preferably, in each case not only a vehicle position is determined, but rather also a direction of travel (orientation) of the vehicle at this vehicle position.

Taking into consideration the further sensor data is highly advantageous particularly when the global positioning system does not deliver any or delivers only very inaccurate information, for example in tunnels or when shaded by tall buildings.

Instead of the Kalman filter, other methods for what is known as "dead reckoning" may be applied, for example other filters such as particle filters (sequential Monte-Carlo methods) or the like.

As an alternative, the position determination takes place solely on the basis of data from the global positioning system or on the basis of these data and for example data from an existing map independent of the system according to the invention (for example of a navigation assistance system).

The associated data advantageously comprise a vehicle orientation and a vehicle speed. These data are useful for further updating the map and for making predictions, and they are additionally easily able to be derived on the basis of the available sensor and positioning system signals. Further data may be associated besides these data.

In a first variant of the method according to the invention, the associated data represent normally distributed variables, a standard deviation being stored in the map in addition to an average of the respective variables. This simplifies both the consolidation of a plurality of data from various journeys and the making of predictions. Other distributions and characteristic parameters may also be applied.

In a second variant of the method according to the invention, the associated data are in each case stored in the map, preferably provided with an indication of time and date. An additional datum is thus stored per journey and parameter. This gives additional degrees of freedom when reading predictive data from the map. It becomes possible for example to take into consideration only data points that relate to a certain time interval or a certain time of day or season, or to exclude data points that are associated with another bus route. Furthermore, errors caused by the convergence of the distribution are avoided by a predefined distribution.

Both in the first and in the second variant, the data may be associated with a plurality of classes, for example times of day, days of the week or seasons, such that the data from the relevant class are able to be applied to the subsequent prediction.

The sensor data preferably comprise speeds of a right-hand wheel and of a left-hand wheel, and a rate of change of the vehicle orientation is calculated from the speeds. Such speed data are usually recorded by the vehicle electronics and are available via a standardized bus (for example CAN bus). The speeds may be present in absolute form or else as differential speeds in relation to the speed of the respective axle. In each case, a difference between the wheel speed and the axle speed delivers information about changes of direction.

It has been found that the relative speeds of the wheels on the front axle are particularly well suited to the further processing in the context of the method according to the invention.

The map is preferably depicted by a directed graph, wherein associated data are assigned to each node of the graph. The node is thus defined by its spatial position and the assigned data (for example power-related data, direction of travel etc.). The depiction as a directed graph is optimally adjusted to the route traveled (multiple times) in the context of the method according to the invention. In contrast to other forms of depiction, for example in a fixedly predefined grid network, the representation by a graph has the advantage that this adjusts far more flexibly to the actual routes: In city centers, the road density is high, which requires a compact grid, which would then be far too detailed for other sections in the surrounding area. The graph does not encounter such problems.

When the route is traveled again each time, the graph is updated, that is to say the spatial position and/or the data assigned to the nodes are adjusted, and new nodes are generated or existing nodes are removed or combined. The route ultimately corresponds to a sequence of nodes each directly connected to one another, along the connecting edges. In this respect, the start point of the route, which is represented by a node of the graph, and the end point of the route, which is represented by another node or (in the case of a round trip) the same node, are connected to one another by a path in the directed graph. The graph may contain branches that correspond to actual branches in the road or rail system or that have occurred due to measurement inaccuracies (and therefore possibly disappear again in a later journey). In the case of a route that is traveled in both directions, both directions of travel are represented by different nodes and edges, so that direction of travel-dependent influences (for example inclines/gradients) are able to be recorded. To this end, it may be expedient in particular to associate an orientation of the vehicle with the individual nodes.

The number of recorded journeys on the corresponding route section may be associated with each edge. This is equivalent to a weighting of the corresponding edges.

In one preferred embodiment of the method, for each new set of associated data, depending on a distance from a last visited node of the graph and on content of a data buffer, it is determined whether
  a) the set of associated data is added to the data buffer, whether
  b) the set of associated data is added to the last visited node, or whether
  c) new nodes are generated.

A set of associated data specifically comprises indications as to the vehicle position (for example longitude and latitude) and the data associated with the vehicle position.

In variant c), in this case, only one new node or a plurality of new nodes may be generated at the same time.

The procedure according to variant a) takes place when the distance between the determined vehicle position and the position associated with the last visited node falls below a certain predefined value (sample distance), which occurs for example when stationary or on a very slow journey. It is assumed in this case that the set of associated data should ultimately be added to the last visited node. Since it is not yet established whether yet more data are likewise added to the last visited node, the buffer storage takes place in the data buffer.

The procedure according to variant b) thus takes place when the distance exceeds the predefined value and the data buffer contains at least one entry. If a plurality of entries are present, appropriate averaging is performed before the set is added to the last visited node.

If the distance is ultimately greater than the predefined value but the buffer is empty, a new node is generated. This is then added to the set of associated data.

By way of the abovementioned steps, the data initially associated with a time are each associated with spatial positions. Data from a plurality of journeys on the route are thus able to be better combined.

Advantageously, when a predefined maximum distance from the last visited node is exceeded, at least two new nodes are generated, wherein a set of interpolated data is associated with a first of the at least two new nodes. This avoids an excessively great distance between neighboring nodes, namely when the position determination of the vehicle takes place at a predefined time interval and the vehicle speed is relatively high. Even when the map is first created in the first journey, a sufficient number of nodes to achieve the desired spatial resolution are essentially additionally generated.

Preferably, depending on the determined vehicle position and the map, a prediction of future location-dependent parameters on the traveled route is made, wherein the prediction is made starting from a node of the directed graph that corresponds to the determined vehicle position. Parameters of interest are namely those that are relevant to a required drive power (for example direct power data, speeds or the like). The parameters may be part of the data associated with the nodes or variables derived therefrom.

The prediction preferably extends over a prediction range that covers a multiplicity of nodes of the directed graph, wherein, in the event that the prediction range extends beyond a fork of the directed graph, nodes of a plurality of branch portions adjoining the fork are taken into consideration to make the prediction. This allows forecasting, even if it is not known what branch portion the vehicle will follow in the further course of the route. A plurality of branch portions may be taken into consideration in various ways: By way of example, averaging may thus take place over the various branch portions. However, it is also possible to initially determine values for all of the branch portions taken into consideration, and to apply an outstanding value (for example minimum, maximum or median) for the further calculation. If for example the power required in a particular section is predicted in order to determine a minimum state of charge of a battery, it may be expedient to apply that branch portion that has the highest energy requirement in order to ensure that the energy stored in the battery is sufficient in each case.

A new prediction is preferably made only when the prediction range of a prediction that has already been made does not cover at least a minimum route section starting from the determined vehicle position. Otherwise, a prediction that has already been made continues to be used. It is thus not necessary to make a new prediction when reaching each new node, but rather only at some of the nodes. The computational burden is thereby able to be minimized.

A new prediction is advantageously made starting from a node that is situated before a fork in the directed graph if the node corresponding to the determined vehicle position is situated in a predefined distance range after this fork.

Specifically, immediately after a fork, it is often not possible, for example due to positioning inaccuracies, to determine without doubt which branch portion the vehicle is following. If then, after reaching a node that corresponds to a fork, a new prediction is made immediately, this still relates only to the established but possibly incorrect branch portion of the graph. Other branch portions for which there is likewise a not insignificant probability that the vehicle is following them are immediately eliminated from the prediction. If the established branch portion is not correct, this results in incorrect predictions. If new predictions are made only when a certain distance range has been covered since the last fork, such incorrect predictions are largely able to be avoided.

If, in the predefined distance range after a fork, the existing prediction no longer covers the minimum route section, a new prediction is expediently generated, starting from the node that constitutes the fork (or a node that is positioned in front of the fork and is at a short distance therefrom). This extends the covered route section and at the same time ensures that the further possible alternatives concerning the further route continue to be taken into consideration.

The method according to the invention for predicting future driving conditions is advantageously used in a method for controlling a vehicle. In this case, the control takes place using a map that has been generated by the method according to the invention.

The control method is in particular suitable for vehicles that comprise at least one electric drive motor. Such a vehicle comprises for example two (or more) different power sources. One of these may be a storage battery that is able to be charged with a corresponding energy supply and allows autonomous driving operation of the vehicle at least on partial routes.

The control makes it possible, inter alia:
a) to ensure a sufficient state of charge of the storage battery for the route to be managed;
b) to optimize the state of charge in relation to an optimum lifetime;
c) to minimize the overall energy requirement; and/or
d) to control further loads (for example heating system, ventilation system, air conditioning system) in a controlled manner depending on the power requirement of the drive motors.

The control method may however also be used in vehicles that have a combustion engine or an electric engine having only one power source. When applied in trucks, for example, relevant information for optimum speed control on hilly terrain is provided, such as for example elevation indications with regard to the route ahead. What is known as "adaptive cruise control" varies the speed within a certain range when driving with cruise control, and thereby allows energy to be saved. By way of example, the speed is slightly increased when going downhill in order to absorb more of the potential energy that would normally have to be "braked". Before the truck enters a route section that leads downhill, which is able to be established through the map generated by the method according to the invention, the speed may thus be slightly reduced so as then to be able to absorb even more of the potential energy during downhill travel.

In a further application in connection with passenger vehicles, relevant information for controlling "real driving" emissions is obtained. Predictive information specifically allows optimized regulation of combustion engines and exhaust gas after-treatment systems. By way of example, regenerating a fully loaded particle filter during urban driving consumes additional fuel in order to increase the exhaust gas temperature. On the freeway, however, the engine runs at higher load and the exhaust gas temperature is already high enough for the particle filter to begin regenerating on its own. Using the predictive information from the map, the regeneration of the particle filter is thus able to be deferred from urban driving to freeway driving under some circumstances.

The map may in particular be used in an optimization method that takes into consideration the entire driving cycle or essential parts thereof.

In one preferred application, the vehicle is a trolleybus having a storage battery for the buffer storage of electrical energy. The trolleybus may draw driving energy directly from the overhead line or from the storage battery. This makes it possible, inter alia, to travel on network sections that are not provided with an overhead line. The storage batteries may be recharged during travel (from the overhead line) or when stationary (station, depot).

The vehicle may be controlled directly and automatically or else indirectly. Said control may in particular comprise the following measures, on their own or in combination:
i) automatic selection of a drive to be used or of a power source used for a drive,
ii) charge control for a storage battery,
iii) automatic switching of a transmission,
iv) outputting of driver assistance information.

Further advantageous embodiments and combinations of features of the invention become apparent from the following detailed description and the patent claims in their entirety.

BRIEF DESCRIPTION OF THE DRAWINGS

In the drawings, which are used to explain the exemplary embodiment.

In principle, identical parts are provided with the same reference signs in the figures.

Ways of Implementing the Invention

One embodiment and one application of the method according to the invention are described in detail below. It relates to buses for passenger transport, in particular on a scheduled service, namely buses that comprise at least one electric drive motor and have at least two power sources (for example a driving battery and an overhead line supply) and/or, in addition to the electric drive motor, have yet another drive motor using another drive technology (for example a combustion engine) (what are known as hybrid electric buses).

Modern passenger buses 1 comprise a series of sensors 3 that are connected to microcontrollers. Said microcontrollers communicate with one another over what is known as a CAN bus 7 (controller area network bus). Essentially all measured sensor data 2 and variables calculated therefrom are able to be accessed via this bus. This serves inter alia for diagnostic purposes in the case of faults with the vehicle.

Figure 1:
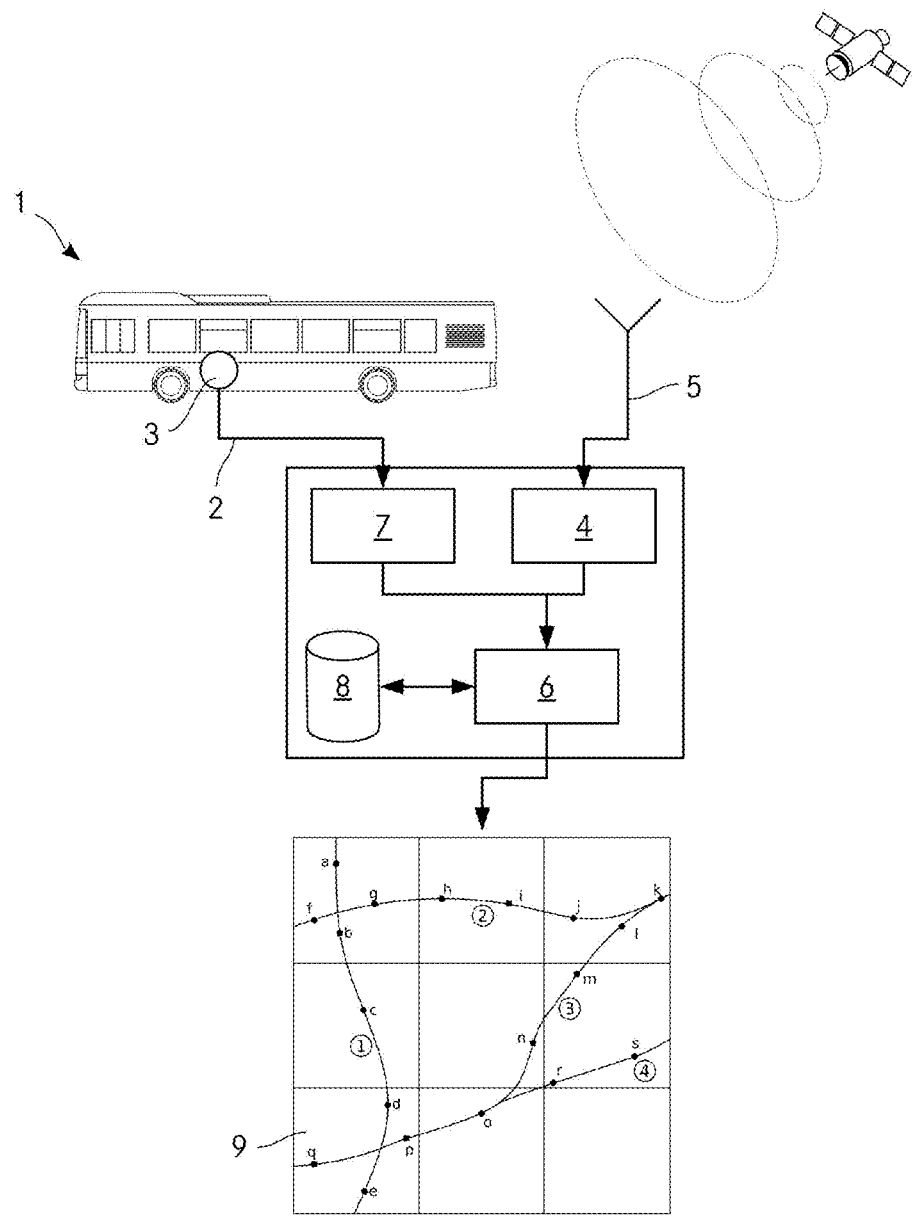
FIG. 1 shows a schematic illustration of one application of the method according to the invention.

To create the map, as illustrated schematically in FIG. 1, sensor signals 2 from the sensors 3 available in the bus 1 in any case and GPS signals 5 are evaluated. Signals from the sensors 3 and from the GPS receiver 4 are received by an on-board computer 6 running a program that creates the map automatically during the journey, as described below, and updates it in a self-learning manner (if the same route section is traveled multiple times). In one variant, the computer may be arranged so as to be stationary and connected to a local communication device on board the bus online via a data connection.

The computer has access to a database 8 in which position data (vehicle location, vehicle orientation, timestamp) and application-specific data are stored. These data, in their entirety, form the map 9. Newly arriving data, where expedient, are combined with the existing data. Specifically, a combination is displayed when a route section already covered by the map 9 is traveled again. This reduces the memory requirement and facilitates the evaluation, that is to say the use of the created map 9 for control purposes.

The creation of the map 9 comprises two main steps. First of all, the sensor data 2 and GPS data 5 are combined in order to obtain an optimum position estimation for the vehicle. To this end, as described in detail further below, a Kalman filter is used. In a second step, the actual map 9 is then created or completed. The program for processing the obtained data is designed in modular form, such that the first module (position estimation) and the second module (map creation) are easily able to be replaced when necessary.

For the described method according to the invention, only a few sensor signals 2 are used that are generally available in modern passenger buses, namely:
  the relative speed of the front left-hand wheel in km/h (that is to say the speed difference between the front left-hand wheel and the front axle);
  the relative speed of the front right-hand wheel in km/h (that is to say the speed difference between the front right-hand wheel and the front axle);
  the relative speed of the rear left-hand wheel in km/h (that is to say the speed difference between the rear left-hand wheel and the rear axle);
  the relative speed of the rear right-hand wheel in km/h (that is to say the speed difference between the rear right-hand wheel and the rear axle);
  the absolute speed of the vehicle, measured at the front axle in km/h; and
  the current rotational speed of the drive shaft of the drive motor in rpm.

The GPS signals 5 are standardized. In the context of the method according to the invention, the following data are required:
  the latitude of the vehicle in degrees;
  the longitude of the vehicle in degrees;
  the elevation (above sea level) of the vehicle in meters;
  the speed of the vehicle in km/h; and
  the direction of travel of the vehicle in degrees.

Both the sensor signals 2 and the GPS signals 5 are impacted by noise and therefore have to be filtered. Use may in this case be made of the fact that both sets of signals comprise position information or make it possible to determine position information by using a state observer, in the present case a Kalman filter, to combine the signals. The corresponding method is described further below.

The result of the filter is a continuous stream of position estimations that describe the spatial positioning of the vehicle as a function of time. New position estimations are generated and output for example at a constant rate of once per second. The position estimation ultimately comprises the following elements:
  the global position in a Cartesian coordinate system (easting, northing);
  the elevation above sea level;
  the orientation of the vehicle;
  a flag that indicates whether satellite navigation data were used for position determination (these are not available for example in a tunnel);
  the time;
  the date;
  the geodesic datum in relation to the global position; and
  the projection in relation to the global position.

In addition to these position estimation elements, further parameters may be associated with each estimation, namely the drive power, the current fuel flow, the required power for further loads on the vehicle, the external temperature, etc.

The map stored in the database consists of a set of data points that are referred to as nodes. As is conventional in graph theory, these nodes are connected to one another by edges. Nodes that have exactly two edges constitute waypoints of a trail. Nodes having three or more edges correspond to forks. Nodes that are connected only to exactly one edge are dead ends, start points or endpoints. The set of all of the nodes and edges forms the graph that corresponds to the map.

Roads are often traveled in both directions. It is important for the described application to distinguish between the directions of travel, that is to say to know on which side of the road and in which direction the vehicle is moving. To this end, a direction of travel is associated with all of the edges, and the graph is thus directed. More precisely, this is a simple digraph, because two nodes should not be connected by more than one edge. Finally, the number of recorded journeys on the corresponding route section is associated with each edge. This is equivalent to a weighting of the corresponding edges.

To simplify the data storage, all of the data, that is to say also information about the connections (edges) and the weighting, are associated with the nodes. Ultimately, the following information is stored for each node:

the identification number of the node;
the position estimation;
a list of all of the nodes to which the current node has an incoming connection;
a list of all of the nodes to which the current node has an outgoing connection;
grid indices that describe the approximate position of the node in the map;
the number of recorded driving movements from this node to subsequent nodes;
further application-specific parameters (for example location-dependent power data, see above).

The grid indices in this case serve to quickly find neighboring nodes without having to apply the position estimations.

The first step of the map creation is a sample rate conversion of the time-based position estimations obtained from the Kalman filter into distance-based data. A decision chain is then run through in order to determine the way in which these position-based data are incorporated into the map. Specifically, a new node may be generated when the corresponding route section has not previously been mapped, or the data are combined with the existing data and associated with existing nodes, specifically when a route section is traveled again.

The result is always a directed graph, all of the information in which is always accessible. Based on the connections between the nodes, it is possible, as described in detail below, to obtain forecasts about the future driving conditions.

As already mentioned, the sensor data and the GPS signals are combined in order to obtain improved position estimations. To this end, an extended Kalman filter is used, as described for example in D. Simon, "Optimal State Estimation: Kalman, H Infinity, and Nonlinear Approaches", John Wiley & Sons, June 2006.

The filter delivers an estimation of the global position, the orientation and the speed of the vehicle at the desired time. The vector of the state variables is defined as follows:

$$\vec{x} = [xyz\theta v\delta\kappa]^T,$$

wherein x, y, z describe the global position in a Cartesian coordinate system (easting, northing, elevation). The orientation is denoted θ, wherein 0° denotes the north and the angle is measured clockwise from the north direction. The (scalar) speed is denoted v. The two further variables δ, κ stand for model parameters that are not known accurately and are therefore determined online by the filter. The variable δ is correlated with the differences in the radii of the right-hand and left-hand wheels and is used to correct the change in the direction of travel. The variable κ stands for the wheel radius divided by the transmission ratio, which is not known accurately and may vary over time.

The input signals for the filter are defined as $$\vec{u} = [\omega \vartheta^L \vartheta^R]^T,$$

wherein ω denotes the rotational speed of the drive axle of the drive motor and $\varepsilon^L$, $\vartheta^R$ denote the relative speeds of the (front) left-hand and right-hand wheel, respectively.

Starting from the current state, the speed is integrated and a prediction about the position of the vehicle is generated. This is then compared with the measured data from the GPS sensor. These are considered to be measured data from the Kalman filter, and the corresponding vector is given by $$\vec{z} = [\hat{x}\hat{y}\hat{z}\hat{\theta}\hat{v}]^T$$

The system is impacted by process noise $\vec{w}$ and observation noise $\vec{v}$:

$$\vec{\omega} = [\epsilon_\omega \epsilon_v L \epsilon_\theta B \epsilon_z \epsilon_\delta \epsilon_\kappa]^T,$$

$$\vec{v} = [\epsilon_x \epsilon_y \epsilon_z \epsilon_\theta \epsilon_\theta]^T,$$

The components of the vectors $\vec{w}$ and $\vec{v}$ are considered to be independent normally distributed random variables.

The measured signals are investigated in terms of their consistency before further processing. By way of example, the relative speeds on both sides of the vehicle should be similar. Otherwise, the vehicle is skidding or the data are incorrect. In both cases, the measured signals are not able to be expediently further processed. It may furthermore be the case that certain sensors pre-process the measured data and therefore distort them; electronic braking systems thus often set small values of the wheel speed to zero. Since these variables are used to calculate a change in the direction of travel of the vehicle, they have to be corrected in order to avoid incorrect results. In the present method, the relative speeds are for example both set to zero when the values correspond to an unrealistic state. The rotational speed of the drive axle may however continue to be used in the model.

The verification of the satellite navigation signals is more challenging. Depending on the device that is used, the loss of a signal connection to a satellite may for example lead to incorrect or else frozen signals. Furthermore, the determined compass direction and the speed may be impacted by strong noise at low driving speeds. Finally, interference is created by signal reflections, for example from tall buildings. To be able to detect such errors, a plurality of validation checks are performed. These essentially compare the signal values with the previous values and the last position estimations. In the Kalman filter, the influence of the input data on the state variable is weighted using the variance of the measured data, that is to say (potentially) incorrect GPS data are provided with a high value for the variance, such that the state vector does not adopt incorrect values.

Figure 2:
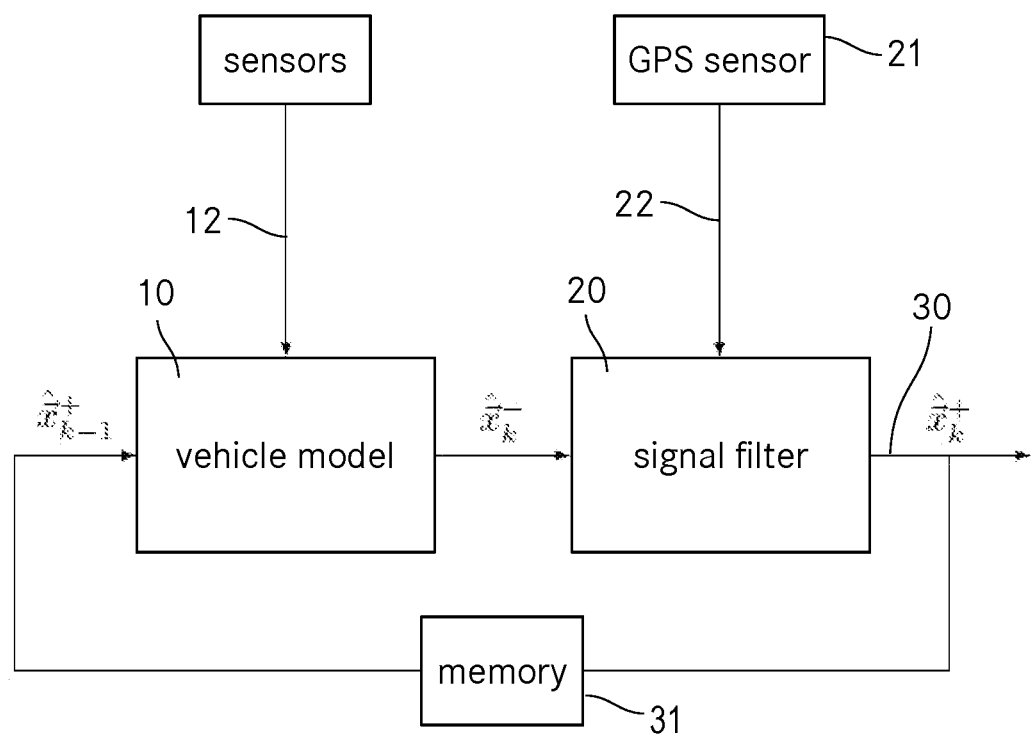
FIG. 2 shows a schematic illustration of the structure of the position estimator.

The structure of the position estimator is illustrated in FIG. 2. The vehicle model 10 serves to update the state variable from a time k−1 to a time k, and the signal filter 20 serves to update the measurement. The vehicle model 10 processes the signals 12 from the vehicle sensors 11, and the signal filter 20 processes the measured data 22 from the GPS sensor 21. The result is a position estimation 30. This is stored in a memory 31 and serves as a start point for the next update of the state variable.

The discrete-time extended Kalman filter that is used is based on the following nonlinear system and measurement equations:

$$\vec{x}_k = \vec{f}_{k-1}(\vec{x}_{k-1}, \vec{u}_{k-1}, \vec{w}_{k-1}), \vec{w}_k \sim \mathcal{N}(0, Q_k),$$

$$\vec{y}_k = \vec{h}_k(\vec{x}_k, \vec{u}_k), \vec{u}_k \sim \mathcal{N}(0, R_k),$$

wherein k and k−1 represent times. The filter is initialized with an estimation for the state and the covariance for the estimation error:

$$\vec{x}_0^+ = E[\vec{x}_0],$$

$$P_0^+ = \text{Var}(\vec{x}_0).$$

The recursion comprises two steps per iteration: An a-priori update of the state and an update of the measurement. In the first step, the system equations are integrated from the time of the last measurement to the time of the next measurement, and in the second step the system is linearized by the best estimation of the state, for which purpose the following matrices are required:

$$F_{k-1} = \frac{\partial \vec{f}_{k-1}}{\partial \vec{x}} \Big|_{\vec{x}_{k-1} = \hat{x}_{k-1}^+, \vec{\omega}_{k-1} = 0},$$

$$L_{k-1} = \frac{\partial \vec{f}_{k-1}}{\partial \vec{\omega}} \Big|_{\vec{x}_{k-1} = \hat{x}_{k-1}^+, \vec{\omega}_{k-1} = 0}.$$

The temporal update of the state estimation and the covariance of the estimation error are then:

$$\vec{x}_k^- = \vec{f}_{k-1}(\vec{x}_{k-1}^+, \vec{u}_{k-1}, 0),$$

$$P_k^- = F_{k-1} P_{k-1}^+ F_{k-1}^T + L_{k-1} Q_{k-1} L_{k-1}^T,$$

wherein the minus sign at the top symbolizes that the state and the variance have been updated by the system. A plus sign at the top marks those variables that have been adjusted by the measurements in the second step of the Kalman filter.

The integration and linearization are repeated, based on the sample time of the input signal $\vec{u}$, until new measured data $\vec{z}$ arrive. The measurement is then updated. To this end, a linear model of the measurement equation is used, as follows:

$$H_k = \frac{\partial \vec{h}_k}{\partial \vec{x}} \Big|_{\vec{x}_{k-1} = \hat{x}_{k-1}^+, \vec{\omega}_{k-1} = 0},$$

$$M_k = \frac{\partial \vec{h}_k}{\partial \vec{v}} \Big|_{\vec{x}_{k-1} = \hat{x}_{k-1}^+, \vec{\omega}_{k-1} = 0}.$$

The new best estimation of the state and of its variance then results as follows:

$$K_k = P_k^- H_k^T (H_k P_k^- H_k^T + M_k R_k M_k^T)^{-1},$$

$$\vec{x}_k^+ = \vec{x}_k^- + K_k (\vec{y}_k - \vec{h}_k(\vec{x}_k^-, 0)),$$

$$P_k^+ = (I - K_k H_k) P_k^-,$$

The content of the vectors and matrices is explained in the specific example below.

The temporal change in the direction of travel may be calculated on the basis of the relative speeds as follows:

$$\dot{\theta} = \arctan\left(\frac{\vartheta^L - \vartheta^R}{l}\right),$$

wherein $l$ denotes the axle gauge. It has been proven that measured signals from the wheels of the front axle deliver better results than those of the rear axle. The speed of the vehicle and that of the drive motor are linked as follows:

$$v = \kappa \cdot \omega,$$

this being linked to the change in the coordinates x, y as follows:

$$\dot{x} = -v \cdot \sin \theta,$$

$$\dot{y} = +v \cdot \cos \theta.$$

This leads to the following discrete-time nonlinear equation that describes the system:

$$\vec{f}_{k-1} = \begin{bmatrix} x_{k-1} - v_{k-1} \cdot \sin(\theta_{k-1}) \cdot \tau_{k-1} \\ y_{k-1} + v_{k-1} \cdot \cos(\theta_{k-1}) \cdot \tau_{k-1} \\ z_{k-1} + \epsilon_z \\ \theta_{k-1} + \tau_{k-1} \cdot \left( \delta_{k-1} + \arctan\left( \frac{v_{k-1}^L + \epsilon_0^L - \theta_{k-1}^R - \epsilon_0^R}{l} \right) \right) \\ \kappa_{k-1} \cdot \omega_{k-1} \\ \delta_{k-1} \\ \kappa_{k-1} \end{bmatrix},$$

wherein $\tau_{k-1}$ indicates the time interval between k−1 and k.

Since five out of seven state variables are able to be measured directly, the following simply results for the nonlinear measurement equation:

$$\vec{h}_k = \begin{bmatrix} \dot{x}_k + \epsilon_0 \\ \dot{y}_k + \epsilon_0 \\ \dot{z}_k + \epsilon_0 \\ \dot{\theta}_k + \varepsilon_0 \\ \dot{v}_k + \epsilon_0 \end{bmatrix}.$$

This gives the matrices F and L, which describe the linearized system, and the matrices H and M, which linearize the measurement equation.

As indicated above, it is assumed that the process noise $\vec{w}$ corresponds to a multivariate normal distribution about zero with covariance Q. It is furthermore assumed that the noise signals are independent of one another. There thus results for Q a symmetric and positive semidefinite diagonal matrix whose diagonal elements each contain the square of the standard deviation (or the variance) of the corresponding variable. The observation noise $\vec{v}$ is white noise with covariance R. There results for this a diagonal matrix R analogous to Q. This is symmetric and positively defined.

The variance of the process noise of a state variable expresses the measure of trustworthiness of the state variable. Small values correspond to a presumably correct value. Therefore, it is necessary to find values for the variance of the model parameters δ and κ that lead to slowly changing but non-constant parameters. Although the state estimation and the covariance of the estimation error are updated during the recursion, an initialization value of the state and of the uncertainty first of all has to be predefined. The values of the state variables result directly from the signals of the navigation device. The initialization value for the model parameter δ is set to zero, and for the other model parameter κ to the nominal wheel diameter divided by the transmission ratio. The corresponding initialization values for the variance define the diagonals of the matrix $P_0$, the other non-disappearing entries describe initial cross-correlations that allow the model parameters δ and κ to influence the associated states θ, respectively v:

$$P_0 = \begin{bmatrix} \sigma_{x_0}^2 & 0 & 0 & 0 & 0 & 0 & 0 \\ 0 & \sigma_{y_0}^2 & 0 & 0 & 0 & 0 & 0 \\ 0 & 0 & \sigma_{z_0}^2 & 0 & 0 & 0 & 0 \\ 0 & 0 & 0 & \sigma_{g_0}^2 & 0 & \sigma_{g_0 x_0}^2 & 0 \\ 0 & 0 & 0 & 0 & \sigma_{x_0}^2 & 0 & \sigma_{\phi_0 x_0}^2 \\ 0 & 0 & 0 & \sigma_{v_0 \kappa_0}^2 & 0 & \sigma_{b_0}^2 & 0 \\ 0 & 0 & 0 & 0 & \sigma_{b_0 x_0}^2 & 0 & \sigma_{b_0}^2 \end{bmatrix}$$

As mentioned above, the map is depicted by a directed digraph. The information used to create the map is generated on a time basis and is accordingly also initially available as a function of time. Time-based data are however poorly suited to consolidating data from a plurality of journeys on the same route with different driving patterns. Therefore, the time-dependent position estimations generated by the Kalman filter are converted into (spatially) equidistant data in a conversion process (resampling). The data points are generated at equal distances along the trajectory of each journey on the route. This gives high flexibility and a constant resolution. The generation of an unnecessarily large number of nodes in route sections that are traveled through slowly or when the vehicle is stationary is avoided.

Figure 3:
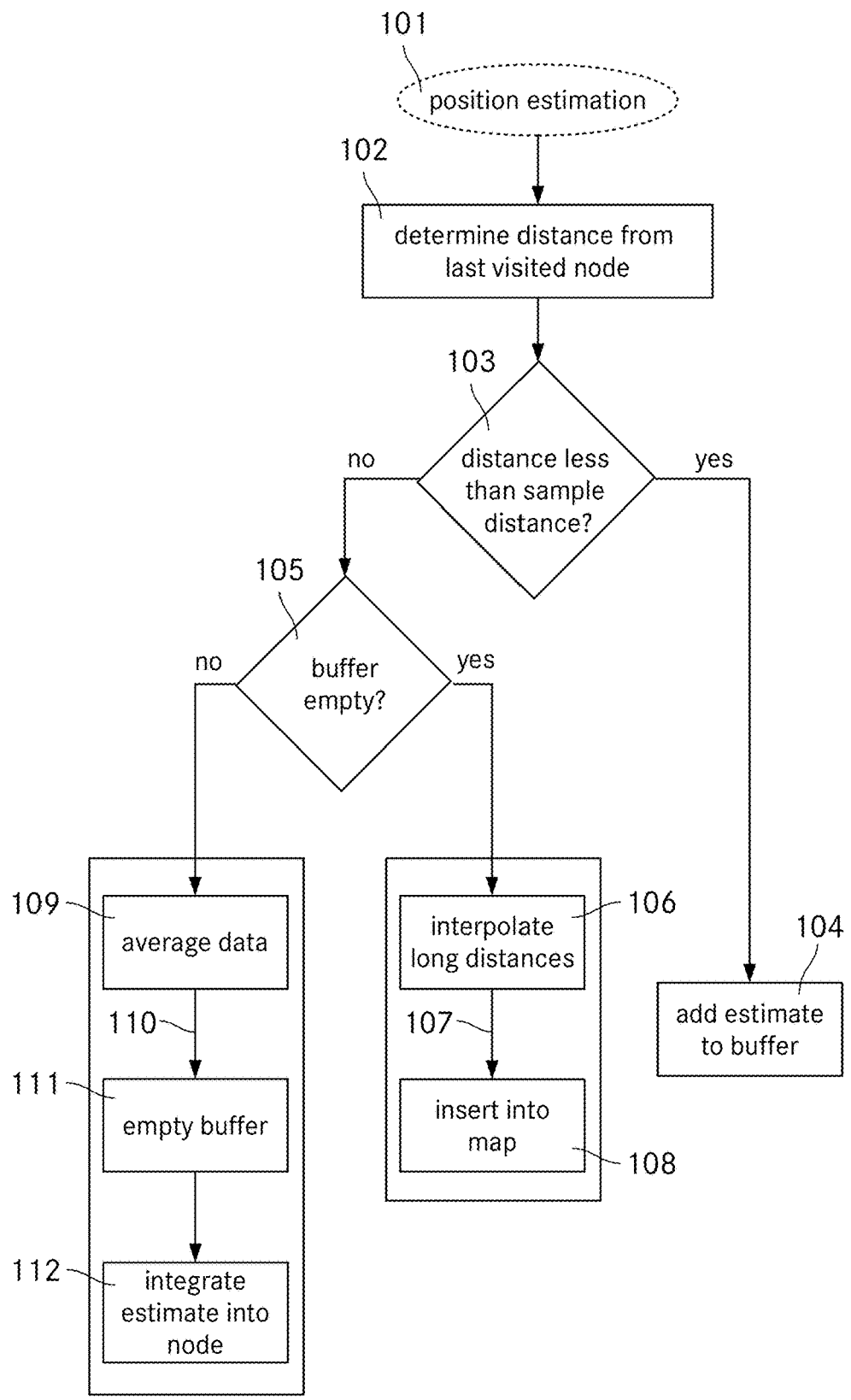
FIG. 3 shows a flowchart of the creation of the map.

Starting from a new, empty map, the first position estimation is added thereto as first node. The sequence illustrated in FIG. 3 then results. This figure is a flowchart of the resampling method, starting from a new position estimation 101. First of all, the distance from the last visited node is determined (step 102). If the distance is less than the sample distance (decision 103), the position estimation 101 is added to a buffer (step 104). If the vehicle is stationary, this buffer is filled with new position estimations with which various sensor signals are associated, for example in relation to the vehicle weight or the required power of additional systems.

If the distance is greater than the sample distance, it is checked whether the buffer is empty (decision 105). If this is the case (for example when driving quickly), long distances are interpolated (step 106), giving a series of position estimations 107, for example along a straight line between the last visited node and the position estimation. A value of 1 m is predefined for example as distance between neighboring nodes. These position estimations 107 of the sequence are then inserted into the map (step 108). If the buffer already contains data, these are averaged in order to reduce the statistical error (step 109), and so an average position estimation 110 is obtained, and the buffer is emptied (step 111). Finally, the average position estimation 110 is integrated into the last visited node (step 112). Therefore, if the previously stationary vehicle drives off, after the sample distance is reached, the data in the buffer are averaged and stored in the last visited node.

The integration of the data includes not just the adjustment of the application-specific parameters, but rather specifically also the position of the node and of course the number of recorded vehicle movements.

When incorporating new position estimations into the map, a distinction is in principle drawn between two cases:
 a) The position estimation belongs to a route section that has already been traveled previously and is mapped in the map;
 b) The position estimation belongs to a route section being traveled for the first time and not previously mapped.

In the second case, the new position estimation is inserted as node and linked to the last visited node. In the first case, the new data have to be appropriately combined with the data of the existing nodes. To this end, the correct existing nodes have to be identified.

This identification process is described below. It is based both on the global position and on the orientation of the vehicle. Those nodes are determined that are located close to the current position estimation and with which a similar vehicle orientation is associated. In view of the accuracy of usual navigation devices, a plurality of series of measurements on the same route may deliver trajectories that deviate from one another by up to 10 m. Since the sample distance generally has to be selected so as to be smaller, it is not expedient to link the new position estimations to all of the nodes that have a distance of less than 10 m, as this would reduce the number of nodes and thus lead to data loss. To obtain the resolution of the map data, there has to be a selection of candidates to which the information should be linked. Starting from a number of nodes that surround the given position estimation, the following is performed for this purpose:

1. Identify surrounding nodes: The surrounding nodes may be easily identified using the grid indices described further above, for example all the nodes in a region having an extent of 50 m×50 m around the given position estimation.
 2. Remove the trace: If a new route section is being traveled, the last visited (previous) node is excluded from the further processing. Data that belong to the new route section being combined with the last visited node is thereby avoided. This step is omitted if the vehicle is situated on a route section that is already mapped.
 3. Orientation filter: The new position estimation should only be linked to those nodes with which a similar orientation is associated. A distinction may thus in particular be drawn between the two directions of travel. This furthermore gives an improved resolution of crossings or forks. By way of example, all nodes whose orientation deviates from that of the position estimation by more than 20° are omitted from consideration.
 4. Identify the nearest nodes: From the remaining nodes, the one nearest the new position estimation is selected. If the corresponding distance is less than 10 m, a reference to this node is stored. Independently of this, the set of remaining nodes is reduced by this node and by the entire chain of nodes that lead to this node or proceed onward from this node. This ensures that only a single node of each independent trajectory is combined with the new position estimation. If nodes still remain after this procedure, the steps of storing the reference of the nearest node and of removing the trajectory are repeated until no nodes are left.
 5. Add or combine nodes: If the previous step has given one or more references, these are combined with the current position estimation to form a single node. If not, a new node is generated with the position estimation and added to the map. This node is then the last visited node for the further processing.

If the new position estimations give a trajectory that runs at a distance from an existing sequence of nodes that corresponds approximately to the threshold value for combination with existing nodes, bypasses may arise that do not represent the actual situation. For these cases, the map that is formed is corrected by the sequence of steps described below:

6. Remove short bypasses: Short bypasses are involved when two forks spaced apart from one another by less than a predefinable maximum distance lead to a parallel profile of two sequences of nodes, wherein the corresponding route sections comply with a certain maximum distance. First of all, a distinction is drawn between main and secondary branch portions of the route, the main branch portion being considered to be that sequence of nodes that corresponds to the shortest travel route. The nodes of the other sequence(s) are then combined with those of the main branch portion, a combination with the spatially nearest node being performed in each case. In this case, as normal, all of the recorded data are combined with those of the nodes of the main branch portion.

7. Correct incorrect connections: The directions of travel associated with the individual nodes are in principle independent of one another. However, if they deviate from one another for example by more than 90°, this suggests an incorrect connection between the nodes. The corresponding nodes and connections are corrected.

8. Combine surrounding nodes: Nodes that are close to one another are combined with one another if the associated directions of travel essentially match (for example do not deviate from one another by more than 20°).

9. Smooth the trajectory: Measurement inaccuracies give sequences of nodes that clearly do not represent the true route profile and for example have a jagged shape. This is able to be removed by smoothing the trajectory. To this end, consideration is given to a sequence of nodes having a predefined length. The average curvature in this sequence is determined, and the positions of the nodes in the sequence are corrected such that an essentially smooth profile results.

10. Divide long edges: Edges between two neighboring nodes that exceed a particular maximum length are divided into several edges, that is to say additional nodes are interpolated and inserted between the neighboring nodes.

Figure 4A:
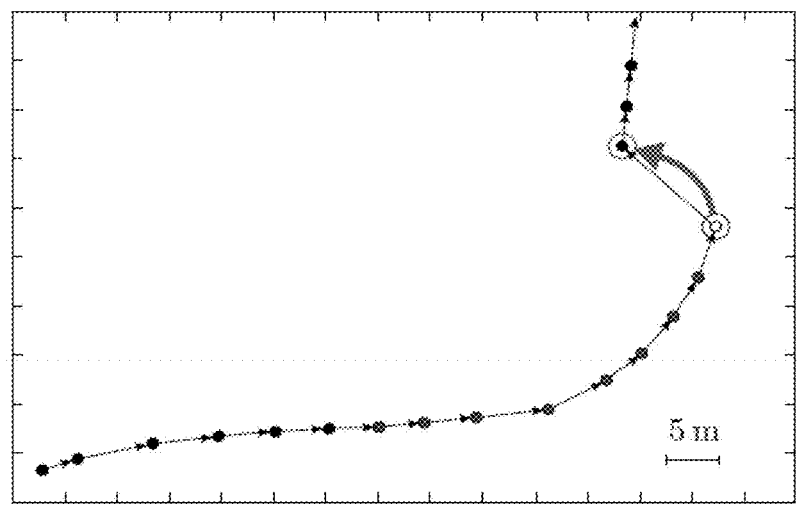
FIG. 4A, B show a schematic illustration of the map of a trajectory leading through a tunnel before and after a correction step.
Figure 4B:
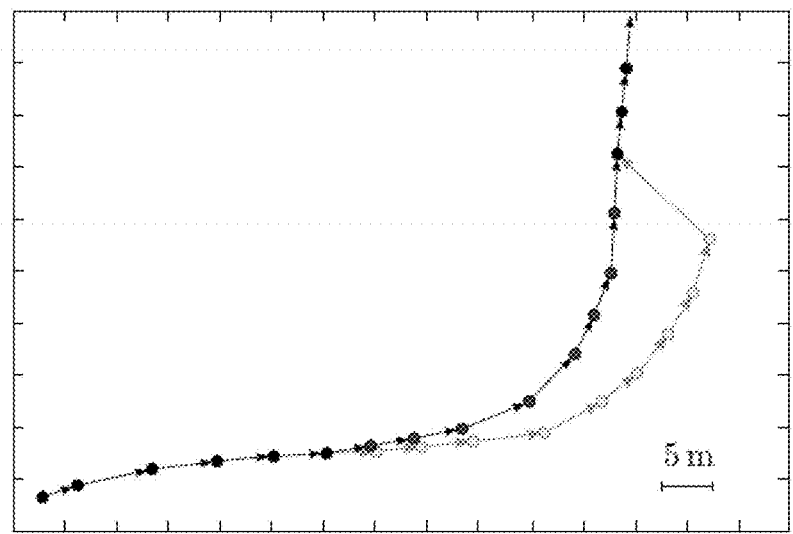

In sections that run in tunnels, where no satellite navigation data are available, an additional correction is performed. This is explained in connection with FIGS. 4A, 4B. Position determination based solely on vehicle sensors will diverge from the true route profile as the travel distance increases, which, when leaving a tunnel, generally leads to the calculated position deviating significantly from the position now determined again through satellite navigation. When leaving a tunnel, this therefore results in a jump in the map that is generated. This is corrected as follows:

The position estimations generated in the tunnel solely on the basis of the signals from the vehicle sensors are not added to existing nodes, but rather first of all treated as a new route. When a satellite navigation signal is then received again, these new nodes are corrected. The nodes are then where possible combined with the existing nodes, in the same way as for the method steps described above.

To correct the new nodes, these and the connecting edges are considered as a mass-spring system, the nodes representing the mass points. Each mass is connected to the neighboring masses by rigid connecting rods fastened thereto in an articulated manner (similarly to in a double pendulum). In addition, torsion springs are arranged on the ends of the connecting rods in the case of each mass. The springs are tension-free when the nodes are situated in the uncorrected positions. A virtual additional node is generated at the end of the mass-spring chain. This additional node is then moved to the position of the adjoining node, which was again determined, inter alia, by way of satellite navigation. The resultant state of equilibrium of the mass-spring chain then corresponds to the corrected profile of the trajectory. If the route section is already mapped by nodes from earlier journeys, the corrected nodes may now be combined with the existing nodes.

When combining position data from a plurality of journeys on the route, it is necessary not only to combine the positions themselves, for example by determining averages, possibly weighted averages. Since the state observer for each state variable delivers a measure of the uncertainty, this information should also be incorporated into the map. This applies not only to the geographical data but also to other application-specific data that are incorporated into the map. Information about the standard deviations delivers an indication about the probability that similar conditions should be expected in multiple journeys on the route, whether for example a route section is always presumably traveled at roughly the same speed or whether this deviates greatly from journey to journey. This information may be highly useful when making predictions.

The data to be combined are described as normally distributed signals since predictions are made possible due to the data stored in the map in a simple manner and without decision procedures. Two such signals may be combined with one another as described below.

The normal distribution of a variable X with average $\mu$ and variance $\sigma^2$ is a static distribution with the following probability density function:

$$\varphi(x, \mu, \sigma) = \frac{1}{\sigma\sqrt{2\pi}} e^{-\frac{(x-\mu)^2}{2\sigma^2}}.$$

Starting from a probability density function f(x) of a continuous random variable X, the expected value and the variance are given as follows:

$$E[X] = \mu_x = \int_{-\infty}^{\infty} x f(x) dx,$$

$$\mathrm{Var}(X) = \sigma_x^2 = \int_{-\infty}^{\infty} (x-\mu_x)^2 \cdot f(x) dx.$$

For discrete random variables, the expected value is simply the average of the individual samples:

$$\mu_Y = \frac{1}{n}\sum_{i=1}^{n} y_i.$$

If an additional sample is added, this gives a new expected value:

$$\overline{\mu}_Y = \frac{1}{n+1}\sum_{i=1}^{n+1} y_i = \frac{1}{n+1}\sum_{i=1}^{n} y_i + \frac{1}{n+1}y_{n+1} = \frac{n\mu_Y + y_{n+1}}{n+1}.$$

A similar situation applies for the variance, which, for discrete random variables, is defined as follows:

$$\sigma_Y^2 = \frac{1}{n}\sum_{i=1}^{n}(y_i - \mu_Y)^2 = \left(\frac{1}{n}\sum_{i=1}^{n} y_i^2\right) - \mu_Y^2.$$

For an additional sample, the following results for the variance:

$$\hat{\sigma}_Y^2 = \frac{1}{n+1} \sum_{i=1}^{n+1} (y_i - \hat{\mu}_Y)^2,$$

$$= \left(\frac{1}{n+1} \sum_{i=1}^{n+1} y_i^2\right) - \left(\frac{1}{n+1} \sum_{i=1}^{n+1} y_i\right),$$

$$= \frac{1}{n+1} \left(\sum_{i=1}^{n} y_i^2 + y_{n+1}^2\right) - \frac{1}{(n+1)^2} \left(\sum_{i=1}^{n} y_i + y_{n+1}\right)^2,$$

wherein we are able to use the above definitions for the expected value and the variance in order to ultimately obtain the following:

$$\hat{\sigma}_Y^2 = \frac{n \, \sigma_Y^2}{n+1} + \frac{n(y_{n+1} - \mu_Y)^2}{(n+1)^2}.$$

Only three variables $\mu_Y$, $\sigma_Y$ and n are thus required to update the expected value and the variance when new samples are present.

One property of the map is the possibility to reduce data when taking into consideration a plurality of journeys on the same route. When combining two previously averaged paths that describe the same route, the following normal distributions are assumed:

$$\varphi(x, \mu_1, \sigma_1) = \frac{1}{\sigma_1 \sqrt{2\pi}} e^{-\frac{(x-\mu_1)^2}{2\sigma_1^2}},$$

$$\varphi(x, \mu_2, \sigma_2) = \frac{1}{\sigma_2 \sqrt{2\pi}} e^{-\frac{(x-\mu_2)^2}{2\sigma_2^2}}.$$

The distribution of the combination, that is to say the sum of the probability densities, is generally not normally distributed. It is however advantageous, for the reasons given above, also to approximate the combination again through a normal distribution. The above definitions of expected value and variance give $$\bar{\mu} = \frac{1}{2} \int_{-\infty}^{\infty} x(\varphi(x, \mu_1, \sigma_1) + \varphi(x, \mu_2, \sigma_2)) dx$$

$$= \frac{1}{2}(\mu_1 + \mu_2),$$

$$\hat{\sigma}^2 = \frac{1}{2} \int_{-\infty}^{\infty} (x - \bar{\mu})^2 \cdot (\varphi(x, \mu_1, \sigma_1) + \varphi(x, \mu_2, \sigma_2)) dx$$

$$= \frac{1}{2}(\sigma_1^2 + \sigma_2^2) + \frac{1}{4}(\mu_1 - \mu_2)^2.$$

Applied generally to combinations of N normal distributions that are weighted with weights $n_i$, this gives:

$$\bar{\mu} = \frac{\sum_{i=1}^{N} n_i \cdot \mu_i}{\sum_{i=1}^{N} n_i},$$

$$\hat{\sigma}^2 = \frac{\sum_{i=1}^{N} n_i \cdot \sigma_i^2}{\sum_{i=1}^{N} n_i} + \frac{\sum_{k=1}^{N} \sum_{j=k}^{N} (\mu_j - \mu_k)^2 \cdot n_j n_k}{\left(\sum_{i=1}^{N} n_i\right)^2},$$

by way of which the normal distribution of the combination is characterized.

To now be able to predict future driving conditions on the basis of the map, a current position estimation is started from. This serves as starting point for the estimation, but is also (subsequently) incorporated into the map in order to update it. The prediction is described using the output of data that are directly correlated with the future energy requirement, specifically an elevation profile h. The method is however readily transferred to the prediction of further parameter profiles.

Figure 5:
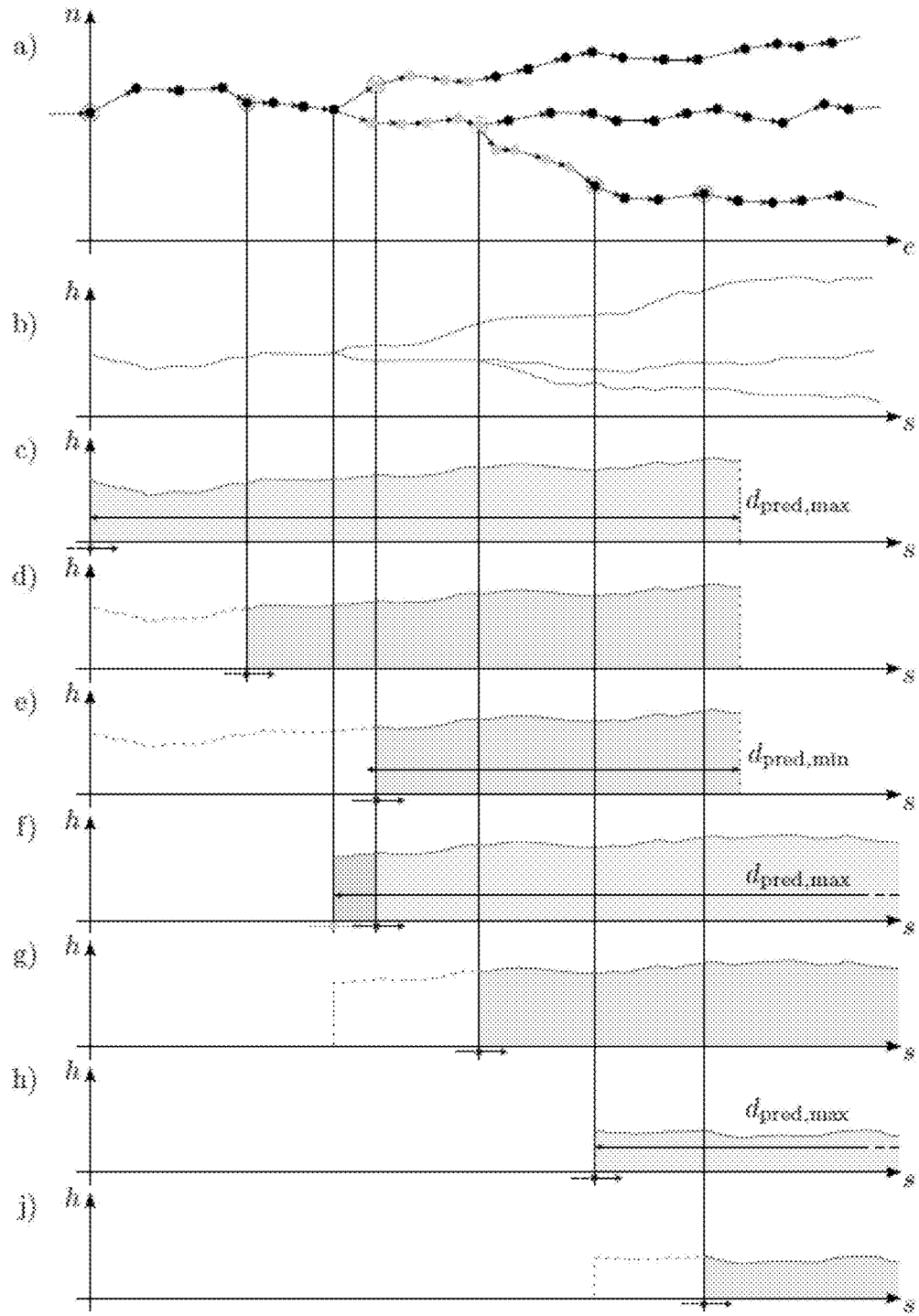
FIG. 5 shows a schematic illustration of the prediction of future driving conditions.

The example is illustrated graphically in FIG. 5, wherein it should be observed that the algorithm is based on the covered route, which is not completely consistent with the illustration in FIG. 5. Although the abscissa is denoted by the journey distances, it is in reality just the north coordinate of the node. It is furthermore assumed that the illustrated map section is static. This does not apply in the actual case because the map changes dynamically when the route is traveled again.

The first illustration a) in FIG. 5 shows a map section in which the global positions of the nodes are depicted using north and east coordinates n, e. We now consider a series of nodes along the lower branch portion, the intention being to predict the future elevation profile starting from the node on the far left. The second illustration b) in FIG. 5 shows the elevation profiles stored in the map individually for the three branch portions of the map section: for the sake of simplicity, the series of curves from the top downward corresponds to the series of branch portions in illustration a). Since two forks and therefore three branch portions are present, it is first of all necessary to take an average in order to allow a prediction about the future profile. The result of this averaging of the elevation profiles in a prediction range up to a maximum distance of $d_{pred,max}$ is recorded in illustration c) of FIG. 5. This prediction, once calculated, is then used when traveling the route again (illustration d)), until a minimum prediction distance $d_{pred,min}$ is achieved. This is the case in illustration e) of FIG. 5. A new prediction is then required that again covers a distance of $d_{pred,max}$. The node from which this prediction is intended to be calculated is situated at the beginning of a branch portion, directly after the first fork. Incorrect associations of branch portions are not unlikely precisely at such points—in fact, the determined position in the example shown is associated with the north branch portion (upper branch portion in illustration a)), rather than correctly with the south branch portion (middle or lower branch portion in illustration a)).

If a prediction were then to be created starting from the current node, it would incorrectly reflect the future driving conditions—the ultimately correct branch portion would not even be taken into consideration. For this reason, when a prediction is made starting from a position that is situated within a predefined distance after a fork (lightly marked node in FIG. 5) a node is started from that is situated before the fork in front (that is to say for example the node at which the path branches). This prediction is illustrated in illustration f) of FIG. 5. It still incorporates all three branch portions, and therefore also the correct south branch portion. The same sequence again results. As soon as a node is reached that is sufficiently far from a previous fork, a new prediction is generated, even if the minimum prediction distance $d_{pred,min}$ has not yet been reached. This is the case in the illustrated example in illustration h).

It is possible in principle to connect the map algorithm to the navigation assistance system of a vehicle. If for example the driver enters his destination and the navigation assistance system calculates a route, the map algorithm could use these route points to improve the prediction. This is helpful in particular if the map contains many crossings and forks—the averaging over a plurality of possible branch portions may thus be dispensed with, and in each case that branch portion that has a high probability of being traveled is taken into consideration. In addition to an improved prediction capability, the prediction has to be updated far less often, since the node sequence is known beforehand. The self-learning map is in no way replaced thereby, since the navigation assistance system is not able to deliver the same driver-specific and vehicle-specific data set.

In the case of use in public means of transport, the combination of self-learning map and a driver assistance system is even simpler. If the driver indicates the current bus route, this information may be intrinsically built into the map, such that, in a prediction of future driving conditions, the map parameters are already clearly assigned to the route and are therefore able to be retrieved unambiguously.

The map that is generated and the method for making predictions are able to be used in particular in the context of a road-based public means of transport, for example a battery-operated or hybrid bus. They are able to be used for example in the context of energy management, as described in the dissertation by P. Elbert, "Noncausal and Causal Optimization Strategies for Hybrid Electric Vehicles", Diss. ETH No. 21522, Eidgenössische Technische Hochschule [Swiss Federal Institute of Technology], Zurich, May 2013. This applies a stochastic depiction of driving behavior in order to achieve optimum energy-saving control of a hybrid bus. A conventional charge controller is not able to predict future energy consumption, for example due to topography, and therefore has to maintain a relatively high state of charge in order to be able to manage possible inclines. This may result in a situation whereby, on a subsequent slope, the actually available energy is not able to be recovered. If a prediction is now available, the state of charge is able to be controlled such that the maximum recovered energy is able to be buffer-stored. The map according to the invention may form the basis for such a prediction. On the basis of the map, the drive power and the vehicle speed are able to predicted, for example. On the basis of these variables, charge control may then take place.

The invention is not restricted to the illustrated exemplary embodiment. It may for example be advantageous for not only the abovementioned GPS data to be incorporated into the evaluation, but rather also additionally estimations from the GPS receiver about an accuracy of the GPS data. Such values, which are known as "dilution of precision" values (DOP values), may be used to improve the position estimation.

In addition to the GPS receiver and said sensors, a sensor for more accurately establishing the elevation may additionally be used—the GPS receiver often delivers only inaccurate results in relation to this parameter. Precise knowledge about the elevation facilitates the creation of the map at locations where a plurality of routes intersect at different elevations.

In the abovementioned method, modeling the map parameters as normally distributed variables is the most drastic simplification. This leads for example to a situation whereby different types of journey on a route section (for example at peak times in comparison with off-peak times with little traffic) are not specifically recorded; only the averages of the individual variables and the corresponding standard deviations are known. Approximation through normal distributions leads to a significant reduction in the data to be processed and to a simplification in the processing and the making of predictions. It is however conceivable for the gathered data to be represented differently. By way of example, instead of a single normal distribution per signal, a plurality of normal distributions could be recorded, these representing the variables on different days of the week, at different times of day and/or during different seasons. In addition, older results that are outdated and are no longer relevant should automatically be forgotten by the map algorithm. The map thereby remains dynamic and therefore mirrors actual reality. From a technical point of view, this means that a certain number of data points per map parameter are stored, and the oldest data are replaced by new data. In order at the same time to give the newer data a higher weighting, what is known as a forgetting factor may be used. Thus, for example, a weighted sum, a weighted average, or a weighted standard deviation of a normal distribution may be calculated. In the context of the invention, however, completely different depictions of the map parameters are also possible.

The described method is capable in principle of integrating information from different vehicles into the same map at the same time and in real time. This allows quicker creation of a map and faster updating—and therefore also predictions that are based on the current circumstances in the traffic network. This works readily if the data relate to vehicles that are spaced a distance apart from one another. If data from vehicles situated near one another have to be integrated, measures that are known per se for memory protection should be taken to avoid conflicts arising.

In summary, it should be noted that the invention provides a method that allows a reliable prediction of future driving conditions for a vehicle.

The invention claimed is:

1. A method for predicting future driving conditions for a vehicle, comprising the following steps:
   a) gathering time-dependent sensor data from sensors on board the vehicle while the vehicle is traveling on a route;
   b) determining a time-dependent position of the vehicle;
   c) associating the gathered time-dependent data with the determined time-dependent vehicle position;
   d) converting the time-dependent associated data into spatially equidistant associated data and creating a map depending on the spatially equidistant associated data;
   e) traveling the route again, the map being updated in real time depending on time-dependent associated data from the repeated traveling;
   f) obtaining a prediction of future driving conditions when traveling the route again, based on the determined vehicle position and the map, wherein
      the map is depicted by a directed graph, wherein converted time-dependent associated data are assigned to each node of the graph;
      depending on the determined vehicle position and the map, a prediction of future location-dependent parameters on the traveled route is made, wherein the prediction is made starting from a node of the directed graph that corresponds to the determined vehicle position; and
      the prediction extends over a prediction range that covers a multiplicity of nodes of the directed graph, wherein the prediction that has already been made continues to be used and a new prediction is made only in response to the prediction range of the prediction that has already been made not covering at least a minimum route section starting from the determined vehicle position such that the new prediction is not made when reaching each new node, but rather only at some of the nodes, wherein, in the event that the prediction range extends beyond a fork of the directed graph, nodes of a plurality of branch portions adjoining the fork are taken into consideration to make the prediction, wherein if the node corresponding to the determined vehicle position is situated in a predefined distance range after the fork in the directed graph, the new prediction is made starting from a node that is situated before the fork in the directed graph.

2. The method as claimed in claim 1, the map comprising location-dependent power data.

3. The method as claimed in claim 1, wherein updating the map comprises consolidating data from various journeys on the route.

4. The method as claimed in claim 1, wherein the gathered sensor data comprises location-relevant information, and wherein the gathered data and data from a global positioning system for determining the vehicle position are combined.

5. The method as claimed in claim 4, wherein the gathered sensor data and data from the global positioning system for determining the vehicle position are combined by way of a Kalman filter.

6. The method as claimed in claim 5, wherein the sensor data comprises speeds of a right-hand wheel and of a left-hand wheel, and wherein a rate of change of the vehicle orientation is calculated from the speeds.

7. The method as claimed in claim 1, the associated data comprising a vehicle orientation and a vehicle speed.

8. The method as claimed in claim 7, wherein the sensor data comprises speeds of a right-hand wheel and of a left-hand wheel, and wherein a rate of change of the vehicle orientation is calculated from the speeds.

9. The method as claimed in claim 1, wherein for each new set of associated data, depending on a distance from a last visited node of the graph and on content of a data buffer, it is determined whether the set of associated data is added to the data buffer, whether the set of associated data is added to the last visited node, or whether new nodes are generated.

10. The method as claimed in claim 9, wherein, when a predefined maximum distance from the last visited node is exceeded, at least two new nodes are generated, wherein a set of interpolated data is associated with a first of the at least two new nodes.

11. The method as claimed in claim 10, wherein the multiplicity of nodes of the directed graph which the prediction extends over includes the first of the at least two new nodes.

12. A method for controlling a vehicle, wherein the control is performed using a map that has been generated by a method as claimed in claim 1.

13. The method as claimed in claim 12, wherein the vehicle is a trolleybus having a storage battery for the buffer storage of electrical energy.

14. The method as claimed in claim 12, wherein the control of the vehicle comprises automatically switching a transmission and/or outputting driver assistance information.

* * * * *